L. K. TIPTON.
Improvement in Cultivators.

No. 130,454. Patented Aug. 13, 1872.

Witnesses:
P. C. Dieterich
W. A. Graham

Inventor:
Lafayette K. Tipton
per
Attorneys.

UNITED STATES PATENT OFFICE.

LAFAYETTE K. TIPTON, OF EASTON, MISSOURI.

IMPROVEMENT IN CULTIVATORS.

Specification forming part of Letters Patent No. 130,454, dated August 13, 1872.

Specification describing a new and useful Improvement in Wheel-Cultivator, invented by LAFAYETTE K. TIPTON, of Easton, Buchanan county, State of Missouri.

Figure 1:
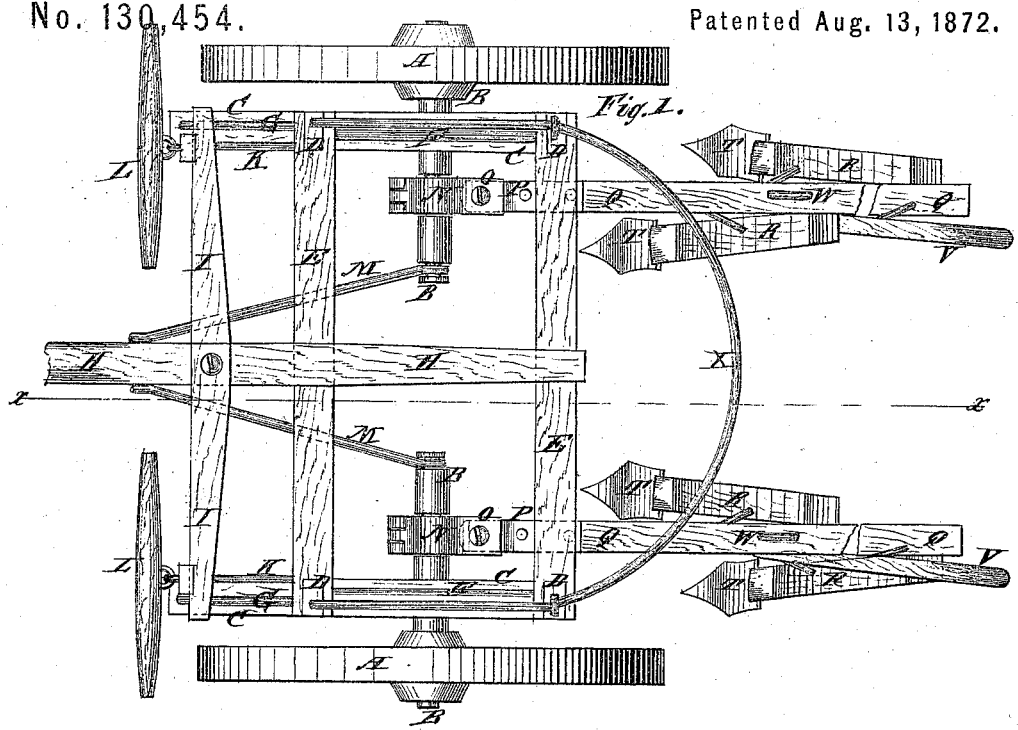
Figures 2, 3, 4:
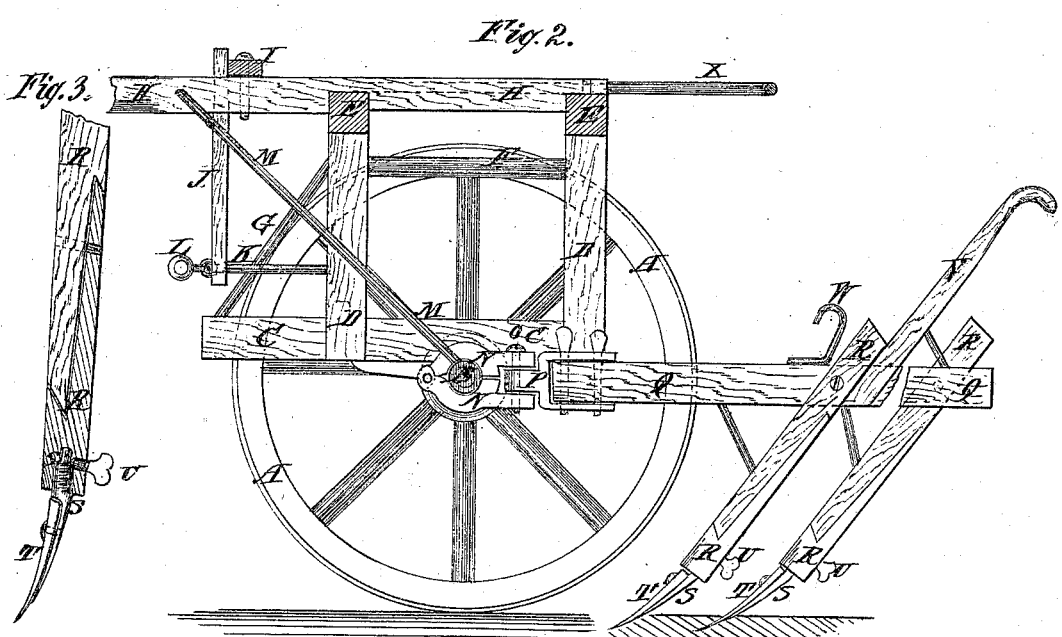

Figure 1 is a top view of my improved cultivator. Fig. 2 is a vertical longitudinal section of the same taken through the line $x$ $x$, Fig. 1. Fig. 3 is a detail longitudinal section of one of the plow-standards. Fig. 4 is a detail side view of the coupling for connecting the plow-beams to the frame of the carriage.

My invention has for its object to furnish an improved wheel-cultivator, simple in construction, convenient in use, and effective in operation, doing its work well, without injuring the plants, even when they may be tall; and it consists in the construction and combination of various parts of the machine, as hereinafter more fully described.

A are the wheels, which revolve upon the journals of the short axles B, which are securely attached to the short bars C. To the bars C, at their rear ends and near their forward ends, are attached the lower ends of the uprights D, the upper ends of the front and rear pairs of which are connected by the cross-bars E, which are thus raised to such a height as to pass over the plants without injuring them. The uprights D, upon each side of the machine, are connected by a bar, F, and they are strengthened by braces G, the lower ends of which are attached to the bars C. To the middle parts of the cross-bars E is attached the tongue H, to which, a little in front of the front cross-bar E, is pivoted a bar, I, to the ends of which are attached the upper ends of two bars, J, through holes in the lower ends of which pass the draft-chains K. The rear ends of the chains K are attached to the front uprights D, and to their forward ends, just in front of the lower ends of the hanging bars J, are attached the whiffletrees L, the weight of which is thus supported by the bars I J, so that the whiffletrees cannot drop down or swing about to strike against and injure the plants. The axles B project upon the inner side of the bars C, space being left between their lower ends for the passage of the row of plants so that they may not be broken or injured by being struck by said axle. The inner ends of the axles B are supported by the brace-rods M, the rear ends of which are attached to the inner ends of the said axles B, and the outer ends of which are attached to the tongue H, as shown in Figs. 1 and 2. Upon the inwardly-projecting parts of the axles B is placed a clasp or clevis, N, which is made in two parts, hinged to each other at their forward ends, and secured to each other at their rear ends by a bolt, O, a space or recess being formed in and between said rear ends to receive the tongues of the clevis P, which is attached to the forward end of the plow-beam Q. The hinged clevis N is kept in place upon the axle B by grooves in said axle, or by pins passed through it, or by other convenient means that will keep it in place and at the same time allow it to be moved out or in to adjust the plows to work further from or closer to the row of plants, as may be required. The coupling N O P allows the plows to be freely moved, vertically or laterally, as may be desired. To the opposite sides of the rear parts of the beams Q are attached the upper parts of the standards R. The standards R may be made wholly of iron, or the upper part of wood and the lower part of iron, as shown in Figs. 2 and 3, said parts being scarfed to each other. In the lower end of the standards R is formed a screw-socket or hole to receive the screw formed upon the upper part of the shank S, to a seat formed upon the lower end of which the plow-plate T is attached.

By this construction, the plow-plates T may be adjusted to throw the soil toward or from the plants, as may be desired. The shanks S are secured in place when adjusted by a set-screw, U, which enters from the rear side of the standard R, as shown in Figs. 2 and 3.

V are the handles, one of which is attached to each plow-beam, Q. To each plow-beam, Q, is attached a hook, W, which is designed to be hooked upon the curved rod X, attached to the top of the frame-work of the machine, to support the plows away from the ground when turning or when passing from place to place.

Having thus described my invention, I claim and desire to secure by Letters Patent—

1. The arrangement of the axles B, braces M, beam H, and frame-work C D E F G, to adapt the machine to receive the plows and afford a free passage for the plants, substantially as herein shown and described.

2. The combination of a screw-shank, S, and set-screw U with the plow T and screw-socket formed in the lower end of the plow-standard R, substantially as herein shown and described, and for the purpose set forth.

LAFAYETTE K. TIPTON.

Witnesses:
C. J. MISSEMER,
E. A. SMYDER.